L. P. EPTON.
SPOKE SECURING DEVICE.
APPLICATION FILED SEPT. 13, 1912.
1,060,542.
Patented Apr. 29, 1913.
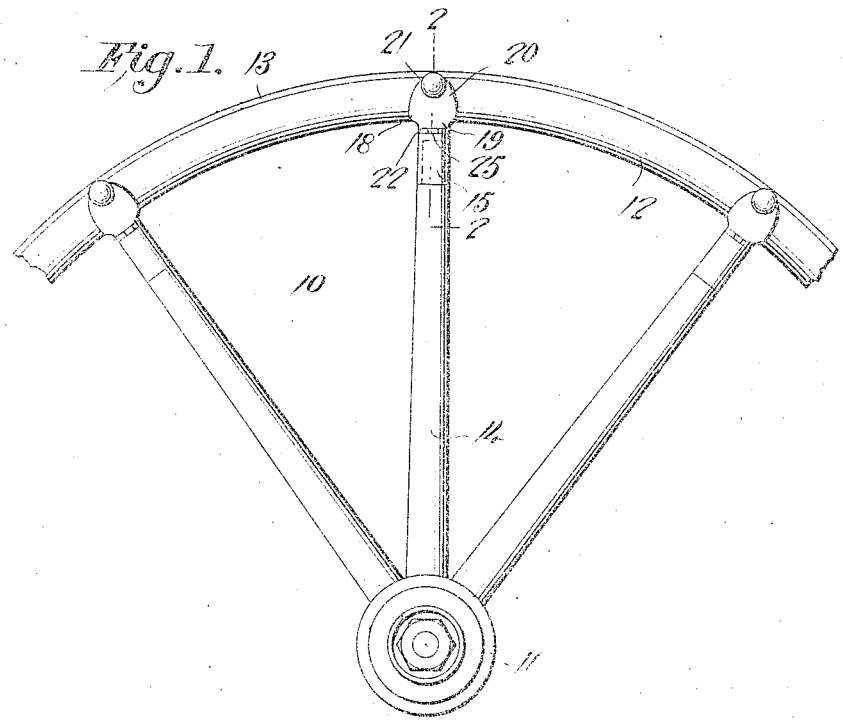
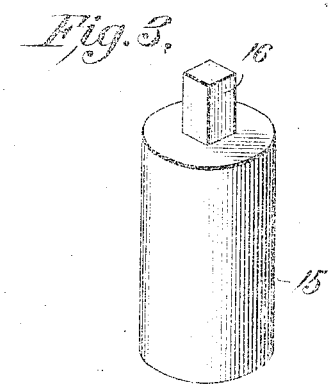
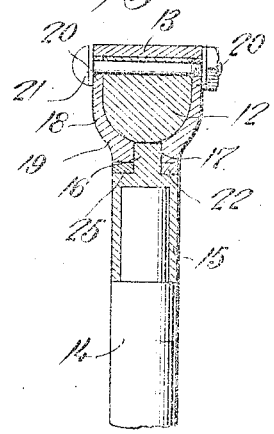
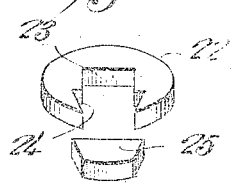
Witnesses
Inventor
L. P. Epton,
By Victor J. Evans
Attorney

UNITED STATES PATENT OFFICE.

LELAND P. EPTON, OF SPARTANBURG, SOUTH CAROLINA.

SPOKE-SECURING DEVICE.

1,060,542.  Specification of Letters Patent.  Patented Apr. 29, 1913.

Application filed September 13, 1912. Serial No. 720,259.

*To all whom it may concern:*

Be it known that I, LELAND P. EPTON, a citizen of the United States, residing at Spartanburg, in the county of Spartanburg and State of South Carolina, have invented new and useful Improvements in Spoke-Securing Devices, of which the following is a specification.

An object of the invention is to provide a device for firmly securing spokes to the felly of a wheel.

The invention embodies, among other features, a device that can be quickly and readily attached to the felly and which includes a socket adapted to receive a thimble provided with a head, the said thimble being mounted on the free end of the spoke for rigidly securing the same in position between the felly and the hub of the wheel, the mentioned construction being provided to greatly strengthen the spoke and the connection of the spoke with the felly of the wheel.

In the further disclosure of the invention reference is to be had to the accompanying drawings, constituting a part of this specification, in which similar characters of reference denote corresponding parts in all the views, and in which:

Figure 1 is a fragmentary side elevation of a wheel showing spokes attached thereto with my invention; Fig. 2 is a vertical sectional view taken on the line 2—2 in Fig. 1; Fig. 3 is a perspective of the thimble; and Fig. 4 is a perspective view of the washer.

Referring more particularly to the views, I disclose a wheel 10 embodying a hub 11 and a felly 12, provided with the usual rim or tire 13, a spoke 14 being secured to the hub 11 in the usual manner and projecting diametrically therefrom for attachment to the felly 12.

A thimble 15, preferably made of metal, is mounted on the free end of the spoke 14 and is provided with an integral reduced head 16, the said head being preferably square in cross section to extend through an opening 17, provided in a cuff 18 consisting of a head 19 terminating in bent ears 20, arranged to partially encircle the felly 12 and conform to the curvature thereof, a bolt 21 being passed transversely through the ears 20 of the cuff 18 and through the felly 12 to rigidly secure the cuff thereto.

The cuff 18 is preferably made of metal and in order to take up any slack or space between the thimble 15 and cuff 18 when the thimble and cuff are connected as shown, a washer 22 is provided, the said washer being interposed between the thimble 15 and cuff 18, and encircling the head 16 of the thimble, a square opening 23 being provided in the washer 22 and through which the head 16 of the thimble 15 is adapted to pass. The washer 22 is also provided with a wedge like slot 24 provided for the purpose of permitting the washer to be interposed between the thimble 15 and the cuff 18, by sliding the washer 22 into position so that the head 16 will pass through the slot 24 and will then be received in the square opening 23. A wedge 25, having a shape similar to the slot 24, is now dropped into the slot 24, thus locking the thimble 15 in the opening 23, the mentioned wedge 25 being of the same thickness as the washer 22 so that when the wedge is in position on the washer, the washer will appear as one piece of material.

It will be readily seen that in applying the device described to the felly 12 and spoke 14, the washer 22 can be dispensed with, the mentioned washer being preferably metal in order to compensate for any shrinkage in the wheel 10 and it will be further seen that slight changes can be made in the particular construction and curvature of the cuff 18 without departing from the spirit of the invention, the scope of the invention being defined in the appended claims.

Having thus described my invention, I claim:

1. In a device of the class described, the combination with a thimble mounted on a spoke of a wheel, a squared head on the said thimble, a cuff rigidly secured to the felly of the wheel and consisting of a head provided with a squared opening and terminating in ears partially encircling the felly of the wheel, a bolt passing through the said ears and the said felly to secure the cuff to the felly, the head of the said thimble being arranged to extend through the opening in the head of the said cuff, and a washer for interposition between the said thimble and the said cuff and encircling the head of the said thimble.

2. In a device of the class described, the combination with a thimble mounted on a spoke of a wheel, a squared head on the said thimble, a cuff rigidly secured to the felly of the wheel and consisting of a head provided with a squared opening and terminating in ears partially encircling the felly of the wheel, a bolt passing through the said ears and the said felly to secure the cuff to the felly, the head of the said thimble being arranged to extend through the opening in the head of the said cuff, a washer for interposition between the said thimble and the said cuff and partially encircling the head of the said thimble, and a wedge for insertion in a wedge like slot in the said washer for locking the said washer between the said cuff and the said thimble.

3. In a device of the class described, the combination with a thimble mounted on a spoke of the wheel, a cuff partially encircling the felly of the wheel, a bolt for securing the cuff to the felly, a squared head on the said thimble and extending through a squared opening in the said cuff, and a washer interposed between the said cuff and the said thimble and encircling the head thereof.

In testimony whereof I affix my signature in presence of two witnesses.

LELAND P. EPTON.

Witnesses:
  A. J. BLACK,
  B. H. BROWN.